United States Patent [19]
Hon

[11] Patent Number: 6,113,395
[45] Date of Patent: Sep. 5, 2000

[54] SELECTABLE INSTRUMENTS WITH HOMING DEVICES FOR HAPTIC VIRTUAL REALITY MEDICAL SIMULATION

[76] Inventor: David C. Hon, 1450 NW. Woodbine Way, Seattle, Wash. 98177

[21] Appl. No.: 09/136,441

[22] Filed: Aug. 18, 1998

[51] Int. Cl.[7] .................................................. G09B 23/28
[52] U.S. Cl. ............................................ 434/262; 434/267
[58] Field of Search ..................................... 434/262, 267, 434/268, 270, 271, 272, 273, 274, 275

[56] References Cited

U.S. PATENT DOCUMENTS

| | | | |
|---|---|---|---|
| 5,766,016 | 6/1998 | Sinclair et al. | 434/262 |
| 5,769,640 | 6/1998 | Jacobus et al. | 434/262 |
| 5,800,178 | 9/1998 | Gillio | 434/262 |

*Primary Examiner*—Kien T. Nguyen
*Assistant Examiner*—John Edmund Rovnak
*Attorney, Agent, or Firm*—Crutsinger & Booth; James O. Dixon

[57] ABSTRACT

Invention is apparatus for using selectable instruments in virtual medical simulations with input devices actuated by user and resembling medical instruments which transmit various identifying data to the virtual computer model from said instruments which have been selected; then, said apparatus assist in creating full immersion for the user in the virtual reality model by tracking and homing to instruments with haptic, or force feedback generating, receptacles with which said instruments dock by means of a numerical grid, creating a seamless interface of instrument selection and use in the virtual reality anatomy.

16 Claims, 7 Drawing Sheets

SELECTABLE INSTRUMENTS WITH HOMING DEVICES FOR HAPTIC VIRTUAL REALITY MEDICAL SIMULATION

1. BACKGROUND OF THE INVENTION

The current invention makes a range of medical simulations more realistic to the user. In virtual reality simulations, the user becomes immersed in a "world" which is artificially constructed from computer graphics in polygon frames to be a visual representation in three dimensions which changes to the user's view as he or she effects movement inside that world. In simple simulations, the user merely navigates around objects and through the virtual environment. Thus, in more complex medical simulations, the user is required to manipulate objects within the virtual environment, changing their places within that artificial, visual domain. When supplementing the virtual experience with physical medical instruments as the interface device, it is far more difficult to achieve realism, but that realism, when achieved, extends out to the very hands of the user.

In the most complex virtual reality simulations, such as medical simulations, the user can grasp and deform anatomical objects with instruments which are virtual within the computer-created world, but which—as interfaces—are handles of the instruments which might be used within that anatomy by doctors performing procedures. This obviously requires sensors of geometric position in the interface. However, in the highest level of virtual reality simulator which also senses interface position geometries, the user will experience not only instrument tactility, but force feedback from the instrument and from the organ which is seen in the virtual environment. In some cases, feedback to the hand has been effectuated through a special glove. Thus in the highest level of medical simulation, both visual and haptic displays must work in coordination.

Other technical elements in the creation of the virtual simulation include whether the user is semi-immersed, or fully immersed. In a semi-immersed situation, the user operates within the virtual world by using some sort of interface—a mouse or a touchpad, voice commands and, at times, mock instruments which electronically serve as an interfaces to the virtual reality. In this semi-immersive virtual reality, the user is watching a remote virtual world—such as one, which would normally be observed on a CRT screen in a minimally invasive surgery, or flexible scope endoscopy, or in performing an angioplasty. The essence of realism in the semi-immersive virtual reality interaction is that in a normal circumstance the user would be performing from a position remote from the event, as a physician is in minimally invasive surgeries which are performed within an enclosed cavity of the body.

In a partially immersed situation, the medical user in a simulation may be looking at a CRT screen, either in two dimensions, as is most usual, or in three dimensions with stereoscopic glasses. The instrument he or she uses is in full direct view and is used remote to the interface as a mouse or a joystick would be. On the screen the user may see the effect of navigating through the virtual reality with the instrument—if it is an simulation of a medical implement with a camera attached, such as a flexible endoscope—or if the camera is one of several implements in the real medical procedure, the user may see part or all of the implement he is manipulating offscreen as an onscreen instrument that matches his offscreen motions. Magnetic tracking devices can be used to portray the instrument in hand as the instrument onscreen, and can even use them to make simple manipulations or deformations of the computer graphics onscreen, as when virtual tissue is grasped, cut, stapled or otherwise deformed in the virtual graphic setting. In this prior art, the instrument is not able to create tactile feedback from itself—as in forming a staple—or force feedback from the virtual anatomy, as in grasping or cutting the virtual tissue. For the creation of force feedback, a resistance-creating device is necessary. If the instrument is build into this device, then the procedure is confined to those instruments which are part of resistance creating devices, which may be somewhat limiting to those surgeons who in a complex operation, may want to use several tools. In the case of the partial immersion, prior art has solved this problem by having instruments "dock" into a force-feedback-creating —or "haptic" —device.

Several of these devices are known. In all of the known devices and proposals of prior art, one of two conditions are present: (1) where the tactility and specific action of the instrument itself is necessary, that instrument in current simulators is built into the haptic device, and so no selection is possible, or (2) where a selection of instruments is possible, the instruments are usually limited to those which interact with the tissue in very basic ways, such as a scalpel cutting as opposed to scissors cutting, or a needle for sewing, or a probe moving the tissue rather than a grasp holding the tissue, and most of the more complex tactile feedback of the instrument itself is not sensed. Furthermore, in this second category of devices, the ability of the instrument to be "docked" is dependent upon direct vision by the user, and in most cases is a deterrent to the overall selection and continuum of reality in the simulation. The virtual medical simulators currently seen, then, fail to provide the surgeon in a virtual simulation an appropriately broad selection of implements that give tactile feedback in themselves, and transmit their specific actions to the simulation. In addition, current virtual medical simulators fail to provide recognition to the computer model of the types of instrument selected, and the person or persons selecting it, to be able to use that information in logic that transcends the anatomy and goes to the roles and physical position of the users themselves.

In fully immersed virtual reality some methodology is used to allow the user almost complete departure from the realistic world surrounding. This is often done by means of a mechanism that shows the visual only to the single user with small screens placed near the eyes within goggles or a head-mounted display. In certain instances, the visuals are projected upon the user's retina. However it is accomplished, in immersed virtual reality, the user has the impression of being surrounded by a completely different place than in the actual surroundings. The Head Mounted immersion may, however, become an accepted or even standard means of remote or semi-remote surgical viewing, because with the head mounted display the surgeon will—on call—be able to see many other kinds of information, such as X-rays, without looking away from his surgery.

In fully immersed virtual reality simulations which involve haptic displays, or more specifically tactile force feedback in medical simulations, the most advanced existing mechanisms both read position on a sensor which translates to a visual location in the virtual environment, and feedback a certain kind and amount of force to that interface device. In the same manner as with the partially immersive situations, watching a CRT as opposed to being surrounded with the picture in a 360 degree environment, these haptic feedback systems will either (1) require that the interfacing instrument be locked into the reader/generator mechanism, to be a part of that mechanism and not interchangeable, or (2) offer some method of reading various interchangeable interface instruments and of imparting feedback to that changeable instrument in a fixed armature, or (3) by placing the instrument (or one's finger) in a receptacle on a mullet-positional arm.

The problem of haptic simulation within a total immersion simulation is (1) that the user cannot see to insert the actual interfacing instrument, so the instrument currently must be fixed or at least pre-inserted in the haptic/reader system, or (2) though they may look down to pick up instruments, the user cannot change instruments and insert them into the receptacle except by reverting to direct view, and taking himself or herself out of the fully immersive environment. In totally immersive medical simulations, in such situations that do not admit of remote procedures that can be semi-immersive, there is currently no way of connecting a free-floating haptic arm with a selectable instrument in a totally immersive environment. Thus there continues to be a need for the haptic receptacle arm to "home" on selected instruments, and seamlessly effect their "docking."

Current virtual reality medical simulators using haptic devices have two qualities: positionality-sensing and force feedback generation. However laudatory those simulators may be, they are lacking (1) the capability for an identified user to easily select between and use two or more instruments requiring complex hand and finger movement, and (2) they lack the capability of tracking, homing, intercepting, and docking with said randomly-selected instruments within the virtual environment.

2. BRIEF DESCRIPTION OF THE INVENTION

The current invention adds those two lacking functions: selectable virtual reality instruments and a homing matrix which allows those instruments to be brought into the virtual environment with the geometry-sensing haptic device homing to the instrument, intercepting its path at the point indicated by the visual display, and docking the instrument within the haptic receptacle. Thus the current invention allows the user to remain in either totally immersed virtual reality or semi-immersed virtual reality, or to operate partially in both.

One embodiment of the invention is centered on less-invasive and minimally invasive cardiac surgeries portrayed in virtual reality simulation using head-mounted displays rather than conventional CRT displays. Looking outwardly, the user will see the virtual depiction of the anatomy. The user will then select a simulated instrument with either hand by glancing straight down, and when it is lifted, said instrument and, in some cases of open surgeries, the representative hand of the user, appears within the total immersion situation. The creation of and attendance to any representative space, whether visual or tangibly physical or both, bears similar problems and can benefit similarly by this invention.

The current invention includes first several identification devices as part of the instruments used. These can be capacitance, or mere selection through a touch screen, but they will also include elements to identify which person is using which instrument, and with which hand.

The current invention includes, secondly, the construction requirement for the instruments to have their own electro-mechanical actuation sensing, for complex hand actions that require precision within an analog set of motions, including pressure at the right moments such as in cutting, grasping, or stapling. In addition, the instrument must have its own tactile characteristics apart from those of a force feedback generating device which conveys the general resistance characteristics of the anatomical tissue, and in some instances carry certain haptic feedback which is part of the instrument rather than part of the anatomical tissue. This would be true of staples that are formed just before they deform the tissue, as in ligation. The feel of forming that staple is a haptic feedback emanating from the instrument itself, rather than from the force feedback-generating device into which the instrument is placed.

Finally, the invention includes both apparatus and processes for defining a spatial grid that will be shared by the instruments and the feedback generating receptacles. The spatial grid represents a physical body in the way each of the pairings coalesces by target acquisition, homing, intercepting and docking. There will be two types of spatial grid, the bounded and the unbounded, though both may assist in the representation of spatial anatomy. In the bounded spatial grid, certain anatomy such as a rib cage made from tangible materials may exist within the spatial grid, and will at times assist in the registration of that grid. For instance, if there is a partially-open surgery exposed intra-costally through the ribs—then it may be highly desirable that the tactility the ribs themselves comes from the tangible materials, and the flesh or cartilage involved be created with virtual haptic interfaces.

In the less-invasive cardiac surgery simulation, the actual procedure in one case is not remote, but is conducted through a small opening in the thoracic cavity. Thus it is in effect "open surgery" rather than remote surgery that is being simulated. In this medical procedure, the user may be using a gloved finger at times as a probing instrument, and at other times, or in parallel, may be using graspers, a scalpel, and a grasper with curved needle for suturing. All of these will be instruments which will be operable in the hands of the user and will been seen to do their functions upon virtual anatomy in the virtual procedure. These instruments, and the glove, will need to be placed into a receptacle arm that generates force feedback.

In the second actual cardiac surgery case, the instruments are inserted through the spaces between the ribs via small incisions or "ports" and scopes may be used to provide the internal point of view for the remote procedure. These may be residing or be placed in a number of force feedback-generating devices, as well as into a receptacle arm.

To simulate the first procedure, it will be necessary to create a virtual arena in computer graphics which includes the outside rib cage and the tissue have an essential "blind" reality of a physical shell, with the ability to create openings in a virtual manner. Within the structure will be two force feedback generating "arms," which will move into place with the "homing" feature of this invention. The "arms" must anticipate the final intersect position of instruments or gloves which are being moved by the user within the virtual space. By bringing the two elements, the force feedback "arm" and the tool into proximity, the action of "docking" will take place in the virtual environment. The position and homing matrices will be keyed to the dynamic polygon structure which provides the virtual visual reference, and so when the instrument moves toward any anatomy in the user's hand, it is "homed," intercepted, and docked by the haptic arm which will present its tactility.

The head-mounted display will be used to display both the internal arena and the area that would ordinarily be Open Surgery. In this manner, any surgery, Open or Remote can be handled in a virtual manner with virtual instruments and anatomy, and with full force feedback. The dynamic and visual boundaries become the outer limits if docking between the homing haptic arm and the freely handled selectable instrument. Thus the homing, intercepting, and docking components become an integral part of creation of a virtual experience in a manner unique to this invention.

Proposals of prior art have a great deal of force feedback generation on the shaft of such an instrument, but nothing on how to give the surgeon a selection of instruments, or how each selected instrument is recognized by the simulation system, or how the specific user is recognized. In this invention, when an simulated medical instrument is said to be selectable, the current invention provides a means of recognizing which instrument is in use, senses the internal operations of the instrument, provides the user an inherent tactility and force feedback in its operation. Moreover, proposals of prior art do not approach the subjects of target acquisition, homing and docking which are important to the virtual head-mounted display environment. With its homing matrix, the current invention allows said selected instrument to enter seamlessly into the virtual reality environment, with no stoppage for the user to insert a new instrument into the simulator under direct vision.

OBJECTS OF THE INVENTION

It is one object of this invention to provide the ability for surgeons using virtual reality medical simulations to select from a plurality of surgical implements to perform in the virtual simulation.

It is another objective of this invention to allow the virtual reality medical simulator to identify which instrument is being used in which area.

It is another objective of this invention to enable the virtual reality medical simulator to identify which person is using said selected instruments.

It is another objective of this invention to provide a virtual and/or physical model of internal or external anatomy comprised of first memory means data, and tactile input devices to create events in said virtual or physical models;

It is yet another objective of this invention to provide a plurality of sensing devices within said instruments to input data from hand and finger motions of the user on the instruments' handles.

It is another objective of this invention to provide a plurality of devices internal to the instrument to create feedback from said hand motions with said instruments.

It is another objective of this invention to provide a numerical three-dimensional grid for matching positionality of instrument and force-generating receptacle.

It is another objective of this invention to provide means for visually displaying actions of virtual implements within the virtual model.

It is another objective of this invention to provide means of electronically identifying either said selected implement or a specific user, or both, from among a plurality of users;

It is still another objective of this invention to provide a means of target acquisition for positioning force generating receptacle to dock with said implement at precise location indicated in virtual model.

4. DETAILED DESCRIPTION OF INVENTION

Figure 1:
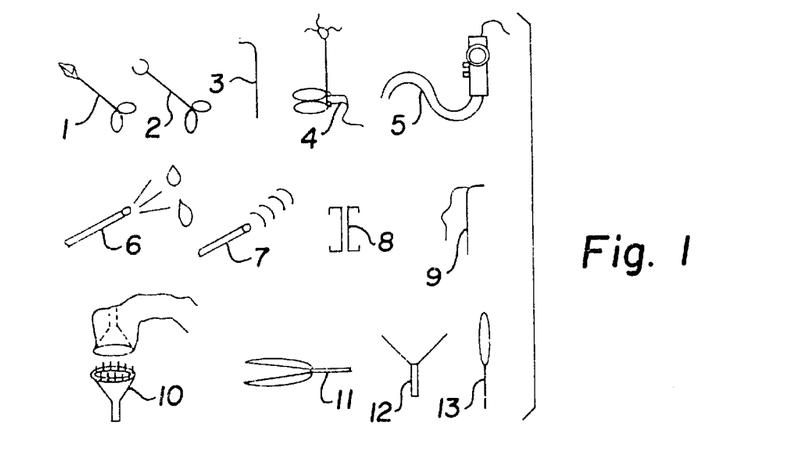
FIG. 1 shows a variety of medical instruments that may be needed in a given virtual reality medical simulation, to be selected as they are needed during a given virtual procedure simulation by the medical professionals involved.

In the surgical operating room, there are many instruments available to the surgeon, and in the most realistic of virtual simulations, the surgeon would have the same instant choice of instrument. FIG. 1 shows a variety of medical instruments that a physician or surgeon would want use in various actual procedures, and in the same manner, would want them to be selectable by the medical professionals involved as those instruments are needed during a given virtual procedure simulation. Some of the more common implements to be expected by surgeons in virtual simulations, would include: Scissors, 1, graspers, 2, probe, 3, cautery, 4, flexible endoscope, 5, irrigator, 6, suction instrument, 7, retractors, 8, curved needle, 9, circular stapler, 10, cutter stapler, 11, camera, 12, and scalpel blade, 13.

Figure 2:
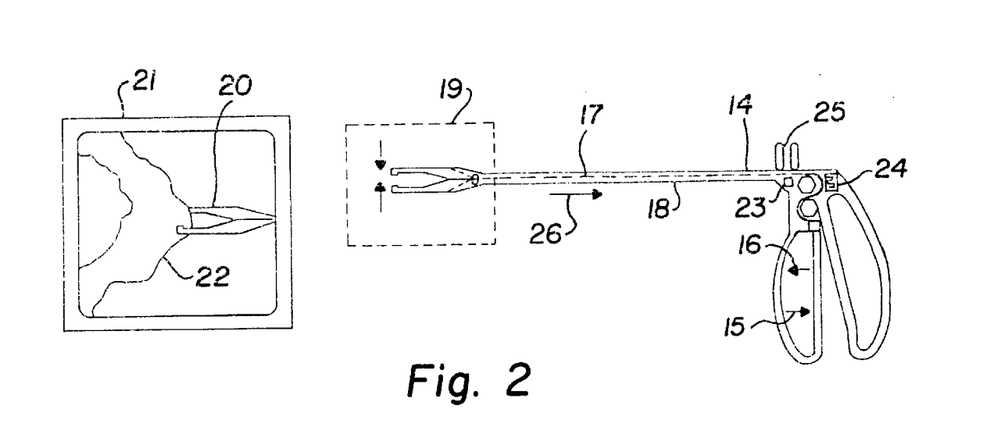
FIG. 2 shows a grasping device for a virtual surgical system, the head for which will not be on the instrument but will operate as part of the virtual reality shown on the screen. The device has sensors to detect hand actuation of the grasper, and various means to impart tactile integrity of the instrument as it is used.

In FIG. 2, one embodiment of the current invention is seen in the construction of a simulated grasper, 14, which has for the user both inherent tactility and logarithmic positionality, as well as generation of local force feedback within the range of the operation of the handle. The handle of the grasper pulls closed, 15, to grip anatomical tissue, and is also pushed open, 16, with the front fingers of the hand to release the grasp, in that way to avoid the use of a spring. In the tools that must operate at a short distance inside the body, such as this grasper, the head is driven open and closed by a push/pull rod, 17, going through the shaft, 18, of the instrument. This instrument, made for simulation, has no head as one would see in actuality. The grasper head in the drawing within the dotted lines, 19, is not on the simulator instrument, but instead is seen virtually, 20, as on a CRT screen, 21, being used with virtual anatomical tissue, 22. The implement is inherently as tactile as the actual instrument, but it also has electronics that read the push/pull rod, 17, at 23. One of several ways to read the shaft would be by opto-electronic edge detection of a pattern on the push/pull rod. The signals generated from the moving rod will be processed within the shaft, 18, by a small microprocessor, 24, which then collects this rod data and other signals and sends them to the computer by known means, 25. The data is sent in real time and makes the grasper head in the virtual image, 20, move in exactly the logarithmic positionality that the actual head would be moving, so that the user retains same eye-hand perception of velocity, 26. The selection signal local to the selected instrument and other local data are transmitted by known wire means to the first memory means in the computer, but other known means include fiber optic cable or wireless transmission by radio, sound, infrared, or other such wireless means from the instrument to the receiving device.

Figure 3:
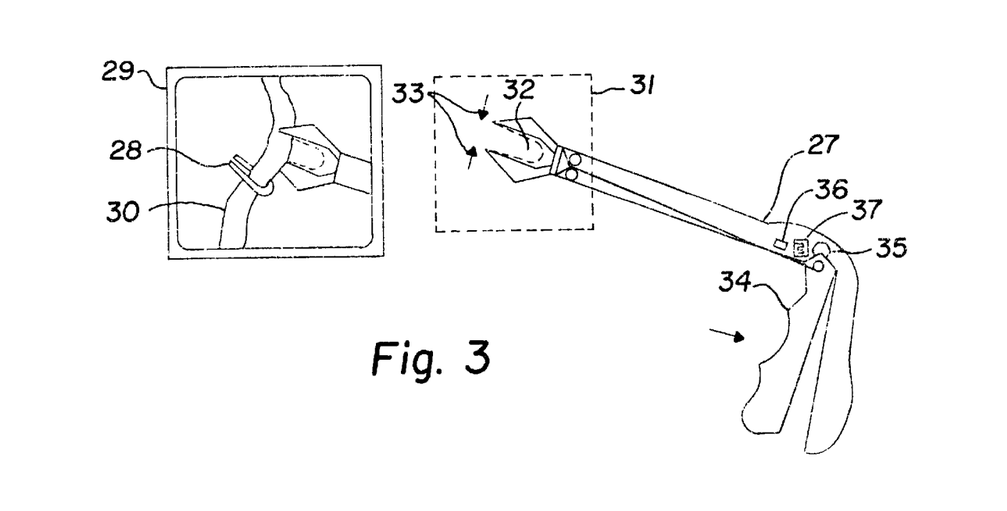
FIG. 3 shows a stapling device for a virtual surgical system, the head and the staple for which will not be on the instrument but will operate as part of the virtual reality shown on the screen. The device has sensors to detect hand actuation of the stapler, and various means to impart tactile integrity of the instrument as it is used.

In FIG. 3, another instrument in the invention is shown, a stapler, 27, that is used to ligate, or seal off, blood vessels before they are cut during the surgical procedure, as in the virtual image. The stapler normally has a feeder for staples, but because this simulator is virtual, the only staples, 28, will be those that appear in the visual representation, 29, acting upon the anatomy, 30. As in FIG. 2, the area with dotted lines, 31, will not be part of the instrument, 27, but the instrument must act and feel as if that stapler head were there. The simulated stapler must give the resistance of a metal staple feeding into the head, 32, and being formed, 33, and the handle, 34, will click and release when the staple's sides would pressed together with precision. The stapleforming tactility will be accomplished with a cam arrangement, 35, in the handle of the mock instrument, but as in FIG. 1, the stapler will have sensors for hand movements. The action of the push/pull rod will be read at 36 by opto-electronic edge detection of a pattern on the rod, or by other means to sense the analog movement electronically. Also as in FIG. 1, a microprocessor, 37, will modify the signal for transmission to the first memory means of the computer.

Figure 4:
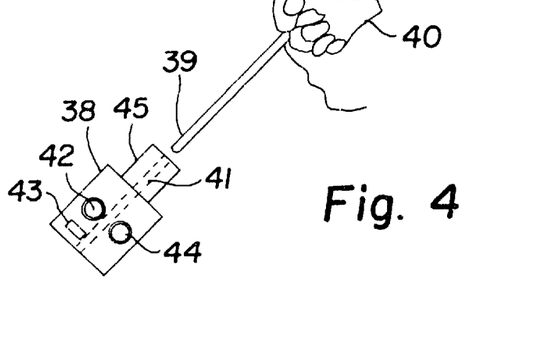
FIG. 4 shows one embodiment of the invention wherein a shaft of an instrument is placed in a device which generates force feedback on the shaft of the instrument.

FIG. 4 shows one device, 38, for general force feedback generation upon the shaft, 39, of the instrument and thus mostly to the wrist and arm of the user, 40, as opposed to that force feedback as occurs in the instruments in FIGS. 2 and 3, which is generated locally in the instrument to the user's hands and fingers for the tactile integrity of the simulator instrument itself, by mechanical or electronic means in the handle or working upon the handle. In this more general device, of which there are known variations extant, the headless shaft, 39, is inserted into hole, 41, in the force feedback generator. Certain sensors read geometric positionality, including depth of insertion, 42, and rotation, 43. At the direction of a first memory means in the computer, motors will drive the shaft backward, 44, rotate it, 45, or move it a few degrees sideways in keeping with the visual deformation and resistance of the virtual anatomy in the visual representation.

Figure 5:
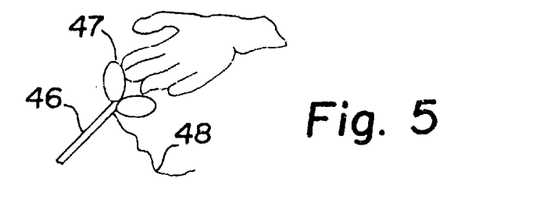
FIG. 5 shows an embodiment of the invention that uses a capacitance method to identify an instrument that has been selected for use.

FIG. 5 shows one method for the computer to identify the instrument selected, 46, by capacitance cause by the touch, 47, of a user. In the instrument shown, the data gathered by its microprocessor is transmitted over wire, 48.

Figure 6:
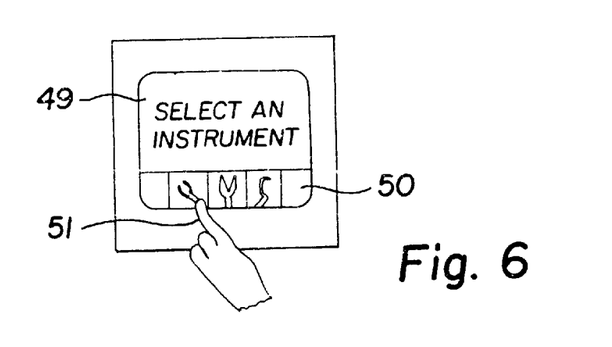
FIG. 6 shows an embodiment of the invention that uses a touch screen selection method to identify an instrument that has been selected for use.

FIG. 6 displays a more conventional method for the user to select an instrument. This method is useful if there are certain handle groups, and the touch screen, 49, allows user's to re-use the same handle of a handle group that has the same analog positionality and the same tactile integrity, as a different instrument which acts as the selected instrument on the virtual anatomy in the simulation. In this embodiment, the user selects from icons, 50, with the touch of a finger at 51. There are many other known methodologies and apparatus for this type of selection.

Figure 7:
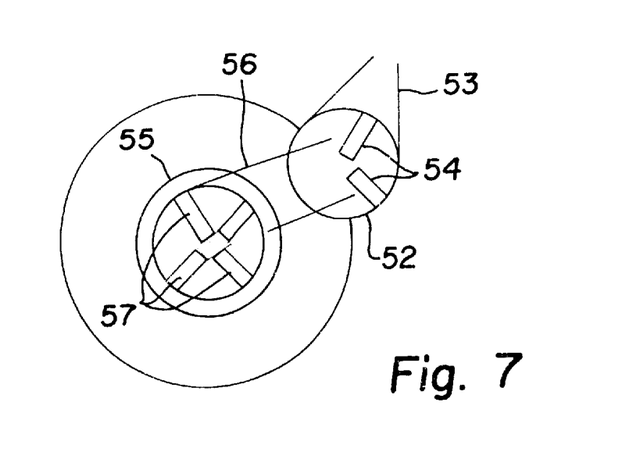
FIG. 7 shows an embodiment of the invention that uses a key insert method for connection of the instrument to the force feedback receptacle to identify an instrument that has been selected for use.

FIG. 7 shows yet another embodiment of the selection identification, wherein the tip, 52, on the end of instrument shaft, 53, has an electro-mechanical key code, 54. The force feedback receptacle, 55, into which the selected instrument fits, 56, makes one of several possible combinations of connections, 57, with electronic contacts on the force feedback generator receptacle. An addition benefit to this methodology is that it offers a means of solid connection from which a motor can generate rotational force feedback to that shaft.

Figure 8:
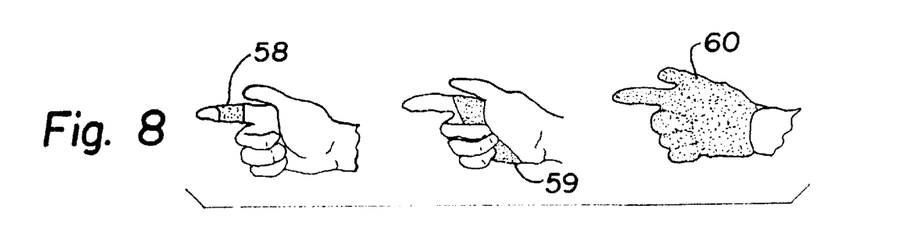
FIG. 8 shows three embodiments of the invention in which the users wear conductive materials to allow the system to identify which user is using which instrument, or if one person has an instrument in each hand.

FIG. 8 displays an embodiment of the identification function of the invention that uniquely identifies not only the individual who is holding the instrument, but with which hand he or she holds the instrument, or two instruments. This may be accomplished by a special capacitance garment, sleeve, or band, to be worn on a specified hand, which will contact the instrument when it is in use. At 58, a finger sleeve with electronically sensitive mesh contacts the instrument handle. At 59, a better connection might be made with a palm band. An even better connection, at 60, would be the full mesh glove with a code that identified which hand of which user holds the instrument, and relays that information to the computer.

Figure 9:
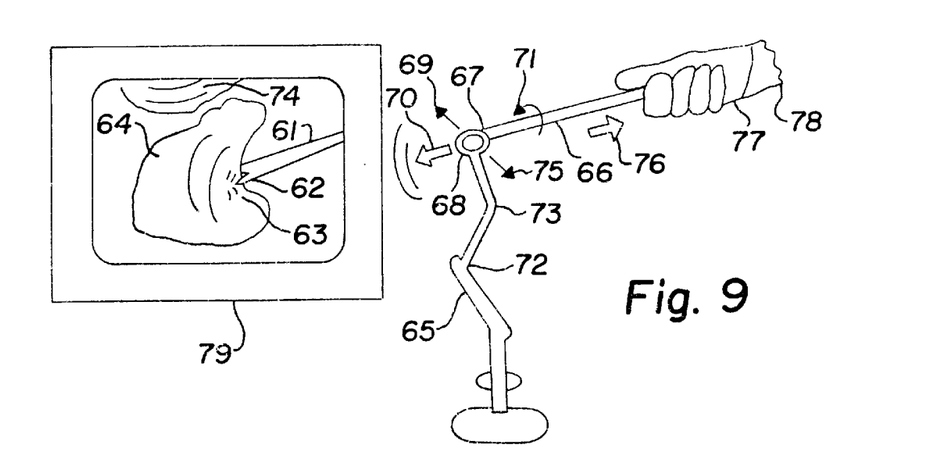
FIG. 9 shows an arm type force feedback device as it is seen in the virtual reality simulation, and as it is operating in actuality to generate forces from the anatomy seen on the screen.

In FIG. 9, another known force feedback generating device is shown. On the screen, the virtual anatomy shows the deformation caused by the instrument. This is the result of a shaft positionality at 61, and a localized instrument positionality, at 62, which senses the opening and closing of the instrument as the user's hand moves. This localized instrument positionality provides the data for the deformation of virtual anatomical tissue at 63, in what is a specific collision of the instrument head as opposed to a general movement of tissue, 64, by the shaft, 61. In parallel, but also in contrast, the general force feedback device, 65, both senses the positionality of the instrument shaft in relation to the virtual tissue, and gives a general force feedback to the shaft, 66, as the general anatomical tissue reacts to general position intrusion and manipulation by the shaft at 64. In this known force feedback device, 65, the tip, 67, of the simulated instrument is inserted by direct view into a receptacle, 68. From that point the force feedback arm senses X and Y, 2-dimensional axes of positionality, at 69, and also a Z-axis which reflects depth, at 70. However, unless the receptacle has a locking integration methodology such as shown in FIG. 7, that known force feedback arm will not sense rotation of the shaft, 71. FIG. 7 then, is in itself an improvement on prior art. To generate force feedback at, the force feedback arm uses small electric motors to move one segment or another of the arm providing counter-positional force at 72, and at 73 and other points of the device. A new set of forces such as might occur with respiratory movement in a patient, 74, may be introduced for realism in a virtual anatomy. It is this proposed ability of force feedback-generating devices to create original position and force for the purposes of realistic virtual display, rather than as reactive force and position, which is one of the foundations of core claims in the current invention dealing with target acquisition and homing methodologies.

The force feedback in FIG. 9 is a general force feedback on the shaft as seen in the X-Y axes at 75, and the Z-axis at 76, and affects the wrist, 77, and arm, 78, of the user. None of the force feedback generated by this device or other known generalized force feedback-generating devices for use with medical instruments gives a localized force feedback within the instrument itself, to the fingers and hand of the user. The cathode ray screen, 79, in this embodiment of the invention is one of many known display technologies for visual representation of a virtual model, including liquid crystal display screens and head mounted displays which may use any of a plurality of known technologies to allow a virtual model to surround the eyes in what is known as "full immersion" virtual reality.

Figure 10:
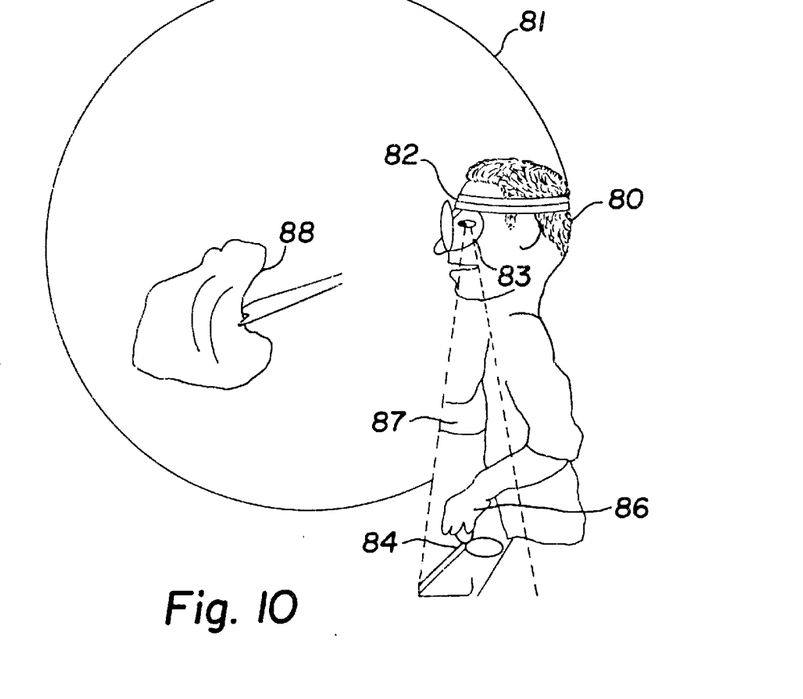
FIG. 10 shows a user wearing a head mounted display, and in front of the user, the anatomy and instrument as the user would see them within the head mounted display.

FIG. 10 portrays an embodiment of the invention wherein the user, 80, is "fully immersed" in the virtual model, 81, by means of a head mounted display, 82, which allows only a narrow area of downward vision, 83, that allows the user to select an instrument, 84, from among a plurality of instruments, 85, within his or her vision and immediate reach, 86. In FIG. 10, the user is already holding an instrument in the right hand, 87, which is seen and felt only in relation to the virtual model in which the user is "fully immersed" at 88.

Figure 11:
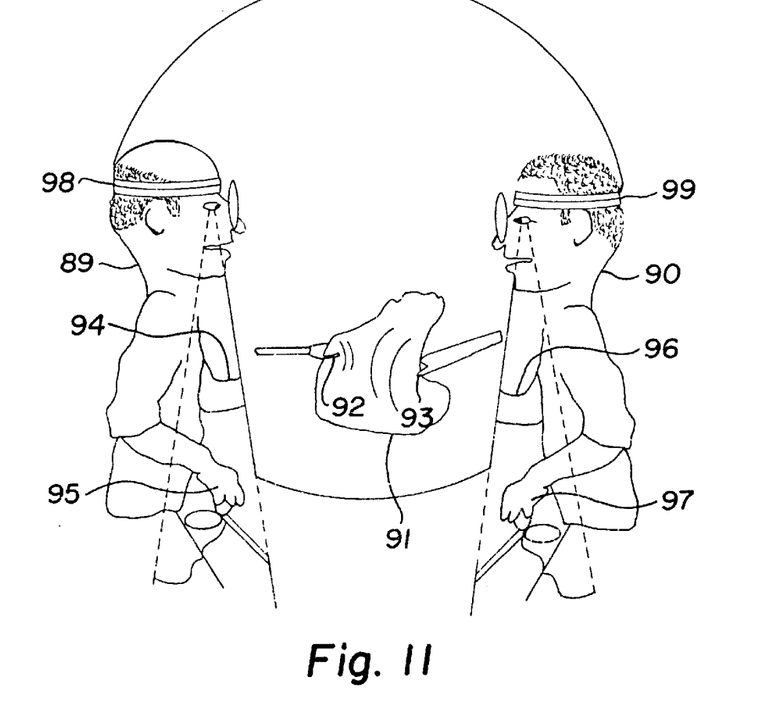
FIG. 11 shows an embodiment of the invention in which a plurality of users participate in the same virtual procedure.

FIG. 11 demonstrates an embodiment of the invention in which a plurality of users, 89 and 90, may participate in a virtual procedure, 91, and in which the selection and identification of instruments at, 92 and 93, and the identification of the participant, 89 and 90, as well as which hand of the participant, 94, 95, 96, and 97, is using each selected instrument, are relevant to the first memory means control of the virtual experience. Each participant, 89 and 90, is not only seeing the results of this selection of and actions with multiple instruments, but he or she is also feeling the tactility of each instrument locally with the hands and fingers, and the general force feedback of the anatomical mass up wrists and arms as generated by a force feedback generator. However, because the head mounted displays at 98 and 99 cause each user to be almost fully immersed in the virtual environment, the participants can see neither the force feedback generators nor the receptacles into which the tips of the instruments must be inserted.

Figure 12:
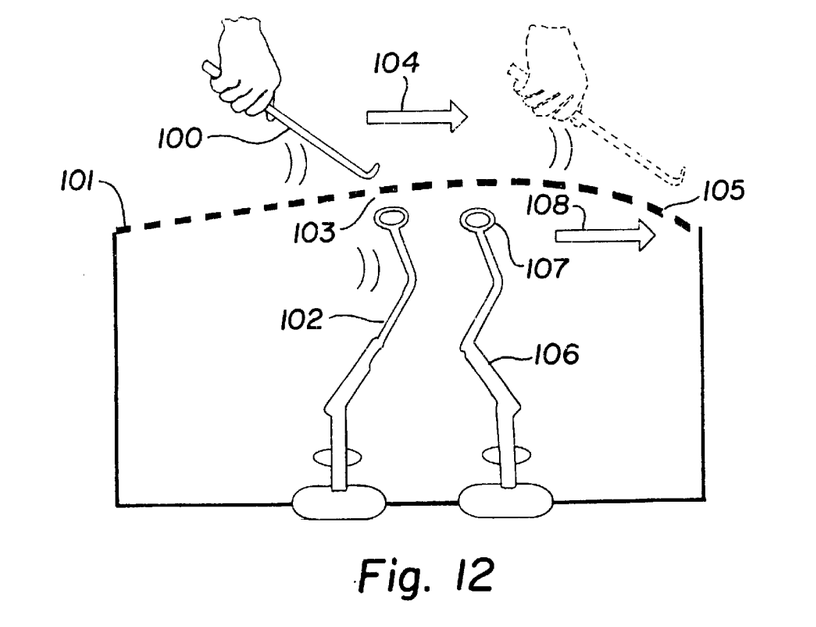
FIG. 12 shows the force feed back devices tracking a single instrument, which is approaching the barrier of virtual anatomy tissue.
Figure 13:
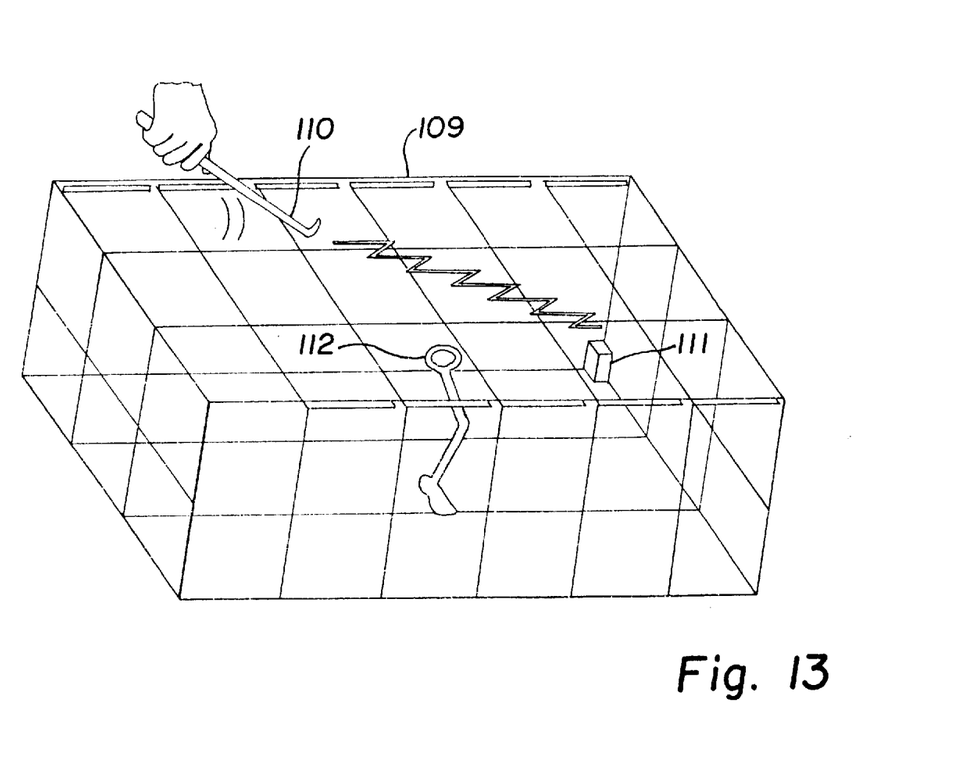
FIG. 13 shows a three-dimensional numerical grid which will be use to track the target instruments and allow the force feedback devices to home on them and facilitate precise docking within the virtual space.

In FIG. 12, an embodiment of the invention is shown wherein the user cannot see the force feedback-generating receptacle, as in FIG. 11. This part of the invention requires a new methodology wherein the tip of the instrument, being tracked in free space by known magnetic, sound, or other technology, becomes a moving target for target acquisition and interception by the appropriate receptacle of appropriate force feedback generator. User selects probe instrument, 100, and moves it toward anatomy surface, 101, in virtual physics model. Closest force feedback generator, 102, has target acquisition on probe, mirrors as it approaches anatomy surface, 101 for potential docking at 103. User moves probe horizontally, 104, to another point on anatomy surface, 105 before inserting. Second force feedback generator, 106, takes over as closest receptacle, 107, moves, 108, to meet probe in potential docking. FIG. 13 shows the numerical grid, 109, which in this embodiment of the invention tracks the approaching instrument, 110, by known means of magnetic tracking, 111, and uses those numerical coordinates to allow the force feedback arm, 112, to acquire the target instrument and "home" toward the approaching instrument by proactive actuation of the arm. Also resident in the first memory means is the positional knowledge of the surface of the virtual anatomy.

Figure 14:
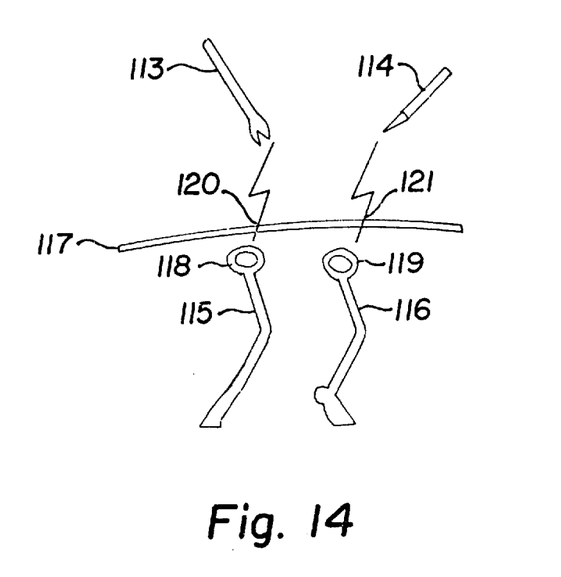
FIG. 14 shows two instruments as targets being acquired at the same time in relation to the same limits of homing. The force feedback receptacle that is closest when the instrument begins to penetrate the virtual anatomy at the limit of homing will move to dock that instrument.

FIG. 14 portrays an embodiment of the invention that uses a plurality of instruments, 113 and 114, to be acquired targets and to dock with force feedback generators, 115 and 116, which are "homing" with the target instruments to the surface of the virtual anatomy, 117. This allows the full interaction of selected instruments with the virtual anatomy, with appropriate force feedback on each which docks precisely into the appropriate receptacle, 118 and 119, at the point they will meet the surface of the anatomy, 120 and 121.

Figure 15:
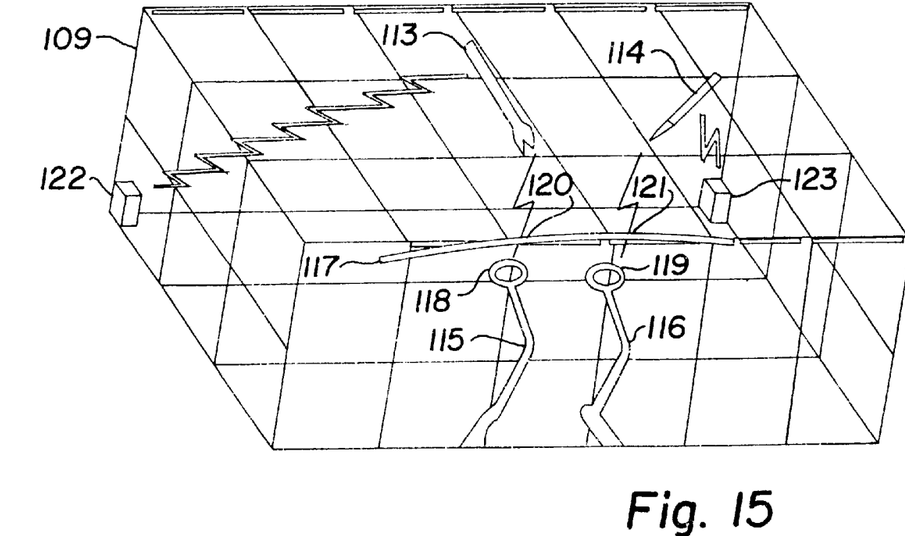
FIG. 15 shows the two instruments as they would penetrate the three dimensional grid in the hands of the user, and the force feedback arms tracking up to the limit of homing as defined by the physics of the virtual reality anatomy.

In FIG. 15, the same instruments, 113 and 114, are shown, with the same haptic, or force feedback, generators, 115 and 116. The surface of the virtual anatomy, 117 has numerical coordinates on the grid, as do the haptic devices. The instruments are placed on the grid by their proximity to the magnetic tracking devices at 122 and 123, and the same receptacles, 118 and 119 are moved in mirror fashion as the instrument targets are acquired and tracked, and the haptic devices "home" to the points it is predicted that the instruments will meet the virtual anatomy at 120 and 121.

Figure 16:
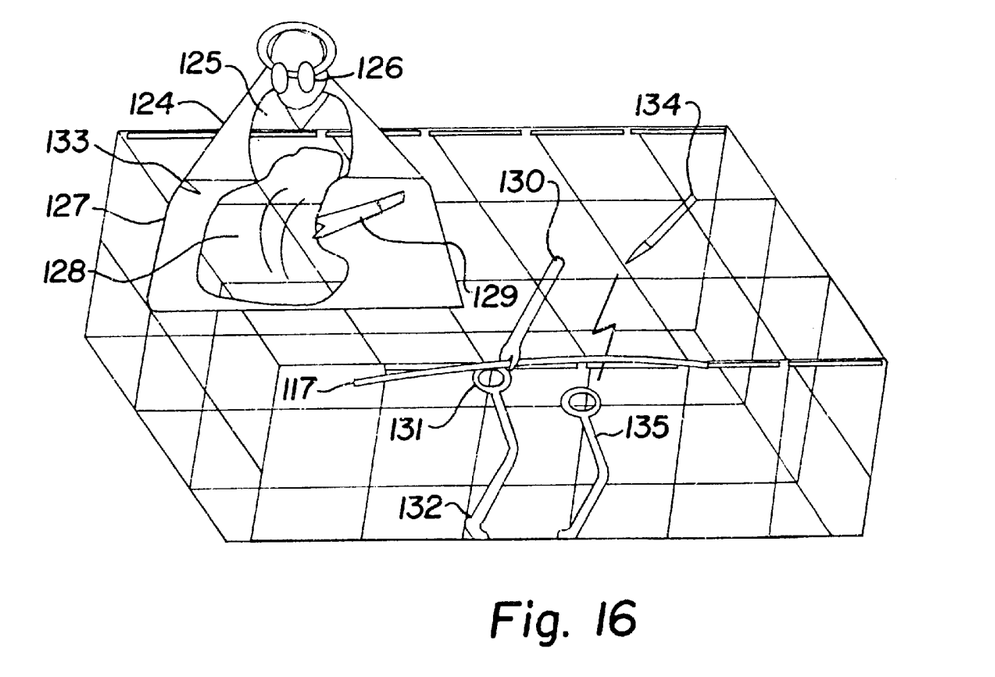
FIG. 16 displays an overlapping view of what the user sees and what is happening during the homing and docking process within the invention.

FIG. 16 shows a rendering of the virtual reality mode, 124, in which eyes of the user, 125, are almost totally occupied by small, close screens, 126, which fit over the eyes like goggles. This gives the user the visual impression of being inside an artificial world, 127, which moves as the head or body tilt up or rotate, as well as having a breadth that allows eyes to see a wide range in any direction with what seems to be a surrounding screen. The surface of the virtual anatomy seen by the user visually, 128, corresponds to the limit of homing for the haptic devices at 117. The one instrument, 129, that is interacting with virtual anatomy, corresponds with the tactile instrument, 130, which is just docking with the receptacle, 131, of a haptic device at 132. The other instrument, 133, which is just entering the user's field of view, is the tactile instrument, 134, which is being acquired as a target for homing and docking by the second haptic device, 135.

Figure 17:
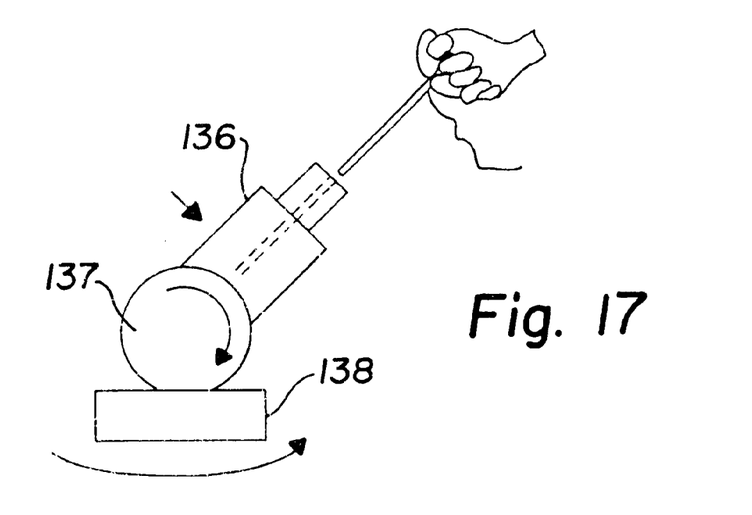
FIG. 17 shows another embodiment of the invention, with a second type of force feedback generating device, and the substructure with two additional degrees of motion that will allow it to acquire a target and home to a precise docking.

FIG. 17 shows the haptic device, 136, from FIG. 4 in an embodiment for homing and docking in a dedicated area. The force feedback generator in this embodiment can move to an angle, 137, and rotate on its base, 138.

Figure 18:
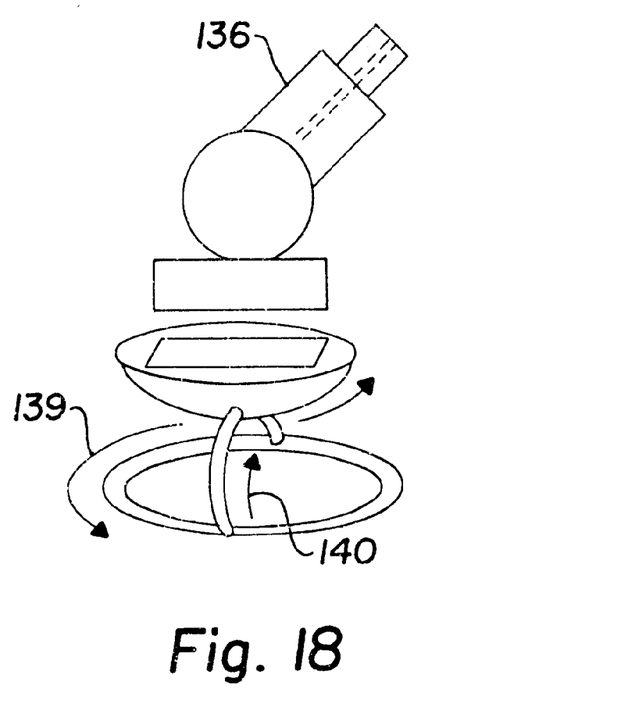
FIG. 18 shows the previous embodiment in FIG. 17, adding a track base and a hemispherical track, to allow more latitude in this force feedback generator's tracking.

FIG. 18 shows another embodiment of this variation on the haptic device, 136, shown in FIG. 17. In this case it can home to a larger area because of a circular base track at 139 and a semi-circular rail at 140. Combined with the localized mechanisms, this haptic device now has 4 degrees of tracking motion.

It can be seen that this invention adds to the efficacy of the surgical simulation by providing unseen linkage between the selection and usage of the instrument locally in the user's hand, and its fill use in the virtual model, docking seamlessly and unseen to the user, and providing the real time haptic response to virtual anatomical tissue that transfers more quickly to actual experience.

What I claim is:

1. An apparatus for using selectable instruments in virtual reality medical simulations comprising:

(a) a virtual model of anatomy comprised of first memory means, a plurality of data generator and receptor means and at least one input device partially resembling a medical instrument for manual operation to create events in said virtual model;

(b) means for transmitting a plurality of signals between said at least one input device and said first memory means, said means for transmitting signals optionally comprising second memory means locally at said at least one input device;

(c) means for visually displaying actions of virtual medical instruments within said virtual model;

(d) means for electronically identifying at least one of (1) a selected input device in use, (2) a specific user of said at least one input device from among a plurality of users, and (3) the specific hand said specific user is using with said at least one input device;

(e) a plurality of force generating receptacles;

(f) a numerical three-dimensional grid for establishing the physical position of said at least one input device and of said plurality of force generating receptacles; and (g) at least one means of target acquisition for homing on said input device and for positioning at least one of said plurality of force generating receptacles to dock with said at least one input device at a precise location derived from said virtual model and said numerical grid.

2. Apparatus as defined in claim 1 wherein said means for transmitting a plurality of signals include means for transmitting local actuation data signals from said at least one input device to said first memory means.

3. Apparatus as defined in claim 1 wherein said at least one input device partially resembles instruments selected from a group consisting of scissors, irrigator, stapler, cutter-stapler, grasper, suction device, circular stapler, flexible endoscope, injection catheter, biopsy catheter, cautery snare catheter, balloon catheter, stent-placement catheter, rotating-blade catheter, drill, routing tool, cutting laser, sealing laser, mechanical sewing tool, bridling tool, probe, camera, needle and thread, scalpel, and cannula.

4. Apparatus as defined in claim 1 wherein said virtual model is of internal anatomy.

5. Apparatus as defined in claim 1 wherein said virtual model is of external anatomy.

6. Apparatus as defined in claim 1 wherein said means for identifying a selected input device is capacitance means.

7. Apparatus as defined in claim 1 wherein said means for identifying a selected input device is electrical-mechanical key-code means.

8. Apparatus as defined in claim 1 wherein said means for identifying a specific user is capacitance means.

9. Apparatus as defined in claim 1 wherein the specific hand said user is using is identified by capacitance means.

10. Apparatus as defined in claim 1 wherein at least one of said plurality of force generating receptacles is of the haptic-arm type.

11. Apparatus as defined in claim 1 wherein at least one of said plurality of force generating receptacles is of the cylinder-receptacle type.

12. An apparatus as defined in claim 1 wherein said at least one input device comprises a plurality of input devices partially resembling a plurality of different medical instruments.

13. Apparatus as defined in claim 1 further comprising at least one sensing device within said at least one input device to detect hand motions of a user.

14. Apparatus as defined in claim 13 wherein said at least one sensing device within said at least one input device generates a feedback signal indicative of said hand motions.

15. Apparatus as defined in claim 1 wherein said means for visually displaying comprises at least one means viewable by more than one user simultaneously.

16. Apparatus as defined in claim 1 wherein said means for visually displaying comprises at least one head mounted means for individual viewing by the wearer of said head mounted means.

* * * * *